2,965,653
ACYLATION OF AMINOANTHRAQUINONES

Albert Bloom, Summit, N.J., and Harlan B. Freyermuth, Easton, Pa., assignors to General Aniline & Film Corporation, New York, N.Y., a corporation of Delaware No Drawing. Filed Dec. 23, 1958, Ser. No. 782,388

6 Claims. (Cl. 260—377)

The present invention relates to aminoanthraquinones and particularly to an improved process of acylating aminoanthraquinones.

There are available several methods for the acylation of aminoanthraquinones which have been published in patents and the chemical literature. One well known method consists of condensing aminoanthraquinones with phthalic anhydride to give the phthaloyl compound. An improvement of this method consists of phthaloylating aminoanthraquinones at temperatures above 200° C. in the presence of ferric chloride. In operating by these processes, approximately 5 moles of phthalic anhydride are used per mole of amino compound and in some instances a solvent, such as nitrobenzene, is employed. Other reported methods consist of reacting an acylating compound with an aminoanthraquinone in chlorobenzene with or without the presence of a catalyst such as ferric chloride. In all of the above methods, the amount of acylating agents used is well in excess of the theoretically required quantity.

Products produced by following the processes disclosed in the literature are relatively crude and generally unusable for further processing unless purification steps are added, thereby increasing the cost of the final product.

The reaction of phthalic anhydride with an aminopolycyclic-hydrocarbon has also been reported. This reaction is conducted in a melt of aluminum chloride and sodium chloride and gives rise to the aroyl benzoic acid or the corresponding anthraquinone derivative. Here, the reaction of the acylating group is with the hydrocarbon ring and not with the amino group. This result is not unexpected since the aluminum chloride would tend to destroy the basicity of the amino group and allow the acylating agent to enter in the well known Friedel-Crafts reaction.

Contrary to the above result obtained when amino polycyclic compounds are reacted with an acylating agent in the presence of an aluminum chloride-sodium chloride melt, we have unexpectedly found that aminoanthraquinones can be readily acylated in such a melt and that in these reactions the acyl group is attached to the amino group rather than to the nucleus. The reaction proceeds at moderate temperatures using practically theoretical equivalents of reactants. This discovery now makes possible the commercial manufacture of acyl aminoanthraquinones of high purity in a one step process. Such acyl aminoanthraquinones are of great value in the manufacture of dyestuffs. For example, one of the uses made of halogenated phthaloyl aminoanthraquinones described in the literature is to condense this compound with aminoanthraquinone compounds using the classical Ulman reaction. This gives rise to imides that are used as dyestuff intermediates. Heretofore, the preparation of these phthaloyl amino halogenated anthraquinones has required two separate operations. First, the aminoanthraquinone would be phthaloylated and isolated and secondly, the phthaloylated aminoanthraquinone so prepared would be halogenated. Our discovery that the acylation can be conducted in an aluminum chloride-sodium chloride melt now allows both the acylation and the halogenation to be conducted in one operation, without isolation of an intermediate.

In accordance with the process of our invention, the aminoanthraquinone, i.e. 1-amino-; 2-amino; 1,5-diamino-; 1,8-diamino-; or 2,6-diaminoanthraquinone to be acylated is first dissolved or suspended in a sufficient quantity of a melt consisting of sodium chloride and aluminum chloride so as to allow the reaction mixture to be stirrable. The sodium chloride-aluminum chloride melt may be modified by the addition of a tertiary base, such as for example, pyridine, which lowers the melting point of the eutectic. The solution or suspension of the aminoanthraquinone in the sodium chloride-aluminum chloride melt is then reacted with slightly more than one equivalent of an acylating agent, such as for example, phthalic anhydride, benzoyl chloride, succinic anhydride, acetyl chloride, acetic anhydride or the like. The reaction mixture is worked up in the conventional manner by drowning into cold water or acidulating with a mineral acid and filtering off the product.

The aluminum chloride-sodium chloride melt may be prepared in a number of ways. The ratio of aluminum chloride to sodium chloride and the inclusion or exclusion of a tertiary base will depend on the temperature that is desired for the reaction. The addition of the tertiary base, such as for example, pyridine, will depress the melting point of the aluminum chloride-sodium chloride melt. The amount of melt to be used should be sufficient to give a stirrable fluid mass for conducting the reaction.

The following examples are illustrative of our improved process.

*Example I*

A three liter, three-necked flask equipped with stirrer, thermometer and drying tube was charged with 77 grams of pyridine and this was heated to 80–90° C. With stirring, a mixture of 770 grams of anhydrous aluminum chloride and 115 grams of sodium chloride (dry) was added. The mixture was heated to 125° C., then the mixture was cooled to 100° C. and 119 grams of 1,5-diaminoanthraquinone (0.5 mole) was added. After the addition of the diamine was completed, the mixture was stirred an additional ½ hour at 100° C. 70.3 grams of benzoyl chloride (0.5 mole) was added during the course of 2 hours to the reaction mixture at 100° C. After completion of the addition of benzoyl chloride the reaction temperature was maintained at 100–110° C. for 1 hour. The reaction mixture was drowned in 10 kg. of mixture of ice and water. The precipitate was filtered on a Buchner funnel and the cake was washed with cold water. After drying the wet cake, a quantitative yield (171 grams) of 1-amino-5-benzoyl-aminoanthraquinone was obtained.

*Example II*

A 250 cc. three-necked flask equipped with stirrer, thermometer and an upright air condenser was charged with 7.7 grams of pyridine (Green oil). A dry powdered mixture of 77.0 grams of anhydrous aluminum chloride and 11.5 grams of dry sodium chloride was slowly added to the pyridine which was heated to 80–90° C. After the addition of the aluminum chloride-sodium chloride mixture, the melt was finally heated to 125° C. for 20–25 minutes. The mixture was then cooled to 100–105° C. and 11.9 grams of 1,5-diaminoanthraquinone (M.W. 238; 0.05 mole) was added. After the completion of the addition of 1,5-diaminoanthraquinone, the mixture was stirred for ½ hour at 100–105° C. and 7.4 grams of phthalic anhydride (0.05 mole) was gradually added. The reaction was then allowed to stir at 100–

105° C. for 1 hour. The reaction mixture was cooled and drowned onto 1200 grams of ice and water. The precipitated product was filtered and washed with cold water. 18.4 grams of the mono phthaloylated derivative of 1,5-diaminoanthraquinone (1-amino-5-phthalimidoanthraquinone) was obtained.

*Example III*

The procedure of Example II was followed except that 11.2 grams of 1-aminoanthraquinone (0.05 mole) was used in place of 11.9 grams of 1,5-diaminoanthraquinone and 8.15 grams (0.055 mole) of phthalic anhydride were used. 16.5 grams of 1-phthalimidoanthraquinone was obtained.

*Example IV*

Example I was repeated with the exception that 11.9 grams of 1,5-diaminoanthraquinone were replaced by an equivalent amount of 1,8-diaminoanthraquinone. After drying the wet cake a substantially quantitative yield of 1-amino-8-benzoyl aminoanthraquinone was obtained.

*Example V*

Example II was repeated with the exception that 11.9 grams of 1,5-diaminoanthraquinone were replaced by the same weight of 2,6-diaminoanthraquinone. After drying the wet cake a substantially quantitative yield of 2-amino-6-phthalimidoanthraquinone was obtained.

We claim:
1. The process of acylating aminoanthraquinones which comprises adding 1 mole of an aminoanthraquinone to a melt of anhydrous aluminum chloride and sodium chloride, maintaining the temperature to keep the melt and aminoanthraquinone in a fluid state, and slowly adding 1 mole in slight excess of an acylating agent selected from the class consisting of acetic anhydride, succinic anhydride, phthalic anhydride and benzoyl chloride while maintaining a temperature to preserve the said fluid state, followed by isolation, filtering and washing of the acylated aminoanthraquinone.

2. The process according to claim 1 wherein the aminoanthraquinone is 1-aminoanthraquinone.

3. The process according to claim 1 wherein the aminoanthraquinone is 1,5-diaminoanthraquinone.

4. The process according to claim 1 wherein the aminoanthraquinone is 1,8-diaminoanthraquinone.

5. The process according to claim 1 wherein the aminoanthraquinone is 2,6-diaminoanthraquinone.

6. The process according to claim 1 wherein the aminoanthraquinone is 2-aminoanthraquinone.

References Cited in the file of this patent

UNITED STATES PATENTS

| | | |
|---|---|---|
| 1,963,109 | Wuertz | June 19, 1934 |
| 1,972,142 | Goldstein | Sept. 4, 1934 |

FOREIGN PATENTS

| | | |
|---|---|---|
| 844,451 | Germany | July 21, 1952 |